United States Patent [19]
Cohen et al.

[11] Patent Number: 5,772,937
[45] Date of Patent: Jun. 30, 1998

[54] METHOD TO PRODUCE AGGREGATE PRODUCTS

[75] Inventors: Sidney M. Cohen, Allentown; Michael E. Prokesch, Zion Hill, both of Pa.

[73] Assignee: Fuller Company, Bethlehem, Pa.

[21] Appl. No.: 732,805

[22] Filed: Oct. 15, 1996

[51] Int. Cl.$^6$ .................................................. B29C 67/04
[52] U.S. Cl. ................................ 264/117; 264/DIG. 69; 425/404; 588/256
[58] Field of Search .................................. 264/115, 117, 264/DIG. 69; 425/222, 404; 588/256

[56] References Cited

U.S. PATENT DOCUMENTS

| | | | |
|---|---|---|---|
| 2,566,117 | 8/1951 | Christie, Jr. et al. | 264/15 |
| 2,686,161 | 8/1954 | Stewart | 264/15 |
| 5,037,286 | 8/1991 | Roberts | 264/117 |
| 5,556,447 | 9/1996 | Srinivasacher et al. | 588/256 |

*Primary Examiner*—Mary Lynn Theisen
*Attorney, Agent, or Firm*—Daniel DeJoseph

[57] ABSTRACT

Disclosed is a method and an apparatus used in said method, to produce aggregate products from waste material streams. The method comprises combining an encapsulation material with waste materials to form a mix suitable for granulation. This mix is then feed to a granulation means to form particles having a size suitable for thermal treatment in a bed thermal processing means, which can be a fluid bed system or a spouting bed system. In the bed thermal processing apparatus the particles are converted into an aggregate product.

23 Claims, 6 Drawing Sheets

METHOD TO PRODUCE AGGREGATE PRODUCTS

FIELD OF THE INVENTION

The invention relates to a method to process a waste material to produce a marketable lightweight or standard weight aggregate for the following applications, among others: concrete block, roofing tile and as a sand replacement in lightweight concrete or concrete block. The invention may utilize waste streams, such as landfill waste streams, that contain both non-hazardous and hazardous materials.

BACKGROUND OF THE INVENTION

1. Field of the Invention

This invention relates to the use of waste materials to produce useful products. Specifically, the invention provides lightweight or standard weight aggregate produced by a process utilizing waste streams such as boiler ash, metallic fumes from metal processing, paper sludge from paper mills or deinking operations, gasifier slags, fly ash from power stations, municipal sewage sludge wastes, municipal garbage, water treatment sludges, bottom ash, and other components.

2. Description of the Related Art

There is currently much public awareness concerning the disposal of waste materials. For example, legislation has been or is in the process of being enacted in many states to limit the disposal of out of state municipal waste and other waste products in local landfills. It is recognized that because these waste products contain heavy metal elements and potentially harmful chemical elements, they pose a disposal problem and also require fairly expensive material handling procedures and equipment.

The disposal expenses and problems posed by many forms of waste are further compounded by the ever decreasing availability of landfills for disposal of these waste materials. Further, this method of disposal also presents problems because of the solubilization of contaminants and heavy metals in these materials that can leach from the waste and contaminate underground aquifers, which are frequently a source of water supply for municipalities and farms.

At the same time, there has been a tremendous increase in the production of liquid waste byproducts from various processes. These liquid waste byproducts must be disposed of in an environmentally responsible manner. Typically, these liquid wastes are disposed of in hazardous waste landfills, at great expense. The liquid wastes are typically placed in drums which are then placed in the storage site. It has been asserted that such drums cannot provide permanent containment of the waste but will deteriorate over a period of time so that leakages may result. These leakages of hazardous material may then seep into the soil ultimately reaching and contaminating underground aquifers that are a source of potable water.

Concurrently, there is also a need in the United States for inexpensive construction materials. Therefore, the invention provides a useful process for disposal of significant quantities of waste and for relieving pressure on scarce landfill resources while also providing a relatively inexpensive material suitable for use in many construction applications.

SUMMARY OF THE INVENTION

This invention describes a method where various waste streams such as boiler ash, metallic fumes from metal processing, paper sludge from paper mills or deinking operations, gasifier slags, fly ash from power stations, municipal sewage sludge wastes, municipal garbage, water treatment sludges, to name a few, are typically encapsulated with a suitable material such as clay or shale, fired in a granulated state in a fluid bed or spouting bed device and made into a saleable aggregate product through thermal treatment. The process of the present invention can be utilized to encapsulate potentially leachable heavy metals and other harmful elements. The materials that may be used for encapsulation include silts, dredgings, waste solids or any other material that offers the necessary chemical composition and binding properties required to generate a pellet of acceptable green strength and firing viscosity and effectively encapsulate and render an inert aggregate. Clay or shale containing materials are presently preferred for a number of reasons: (1) they typically offer the necessary chemical composition and binding properties required for encapsulation and (2) they are readily available.

Since many of such waste streams suitable for use in the present invention contain heat value, the process is, in one embodiment, directed to utilizing this heat to reduce the level of outside fuel addition required for thermal processing.

The process is briefly described as follows:

a suitable encapsulation material such as clay or ground shale is combined with waste material components in a shredder pug mill or other mixing device. The proportions of the mix components are determined by adjusting the chemistry to produce a mix whose mass will become viscous enough without melting to entrap a bloating gas produced within the feed particle and expand, or demonstrates a weight reduction due to a loss on ignition. It has been discovered that the majority of waste materials require the addition of 40–50% (dry basis) of a binding encapsulating component such as clay or shale. The proportion is dictated by component chemistry, the presence of fluxing elements, extrusion/compacting properties, volatile level and heat value of the waste component and desired product density. It is possible that the waste stream may be of a suitable chemical/physical form to exclude the need for a binding component.

In the case of pellet densification, the vitrified solid produced will have the potential to meet lightweight aggregate density requirements due to the formation of voids within the pellet as a result of the burn out of the combustible fraction contained in the waste stream components.

The mix is then either compacted in a roll compactor unit or similar device, or extruded. Compaction can be performed using mix components in a dry state, or with the addition of a small percentage of water to improve compaction characteristics. Extruding typically requires a feed stock containing a higher moisture level than compaction in order to obtain the necessary plastic qualities. This moisture requirement may already be present in the various mix components, thereby eliminating a further addition of water.

The compacted mix is fed to a granulation unit or similar device followed by screening to produce particles generally 4 mesh×20 mesh in size suitable for fluid bed processing. The minus 20 mesh fines generated during the sizing procedure are returned to the compaction unit. If extrusions are produced, drying is required utilizing a rotary dryer or comparable device and waste heat from the pyroprocessing circuit. The dry extrusions then undergo a granulation and screening process to produce a 4×20 mesh feed, with the dried minus 20 mesh fines being returned to the extruder. Dry fines may be used for moisture control if the components contain high levels of free moisture.

The pyroprocessing unit consists of a refractory lined fluid bed or spouting bed system for thermal processing of the granulated mix in a fluidized state. This mode of processing offers excellent thermal transfer and process temperature control, and reduced emissions of nitrous oxides due to the lack of flame generation in the presence of excess air. The off gas from the fluid bed process passes through a radiant heat exchange device, where heat is transferred to the main process air stream to reduce the process fuel consumption. This heat exchange is also necessary to reduce the gas input temperature to the subsequent direct-contact material preheater to minimize the potential for pyrolysis of the feed volatile component if present; thereby minimizing the potential for hydrocarbon emissions from the process. The material preheater could be a rotary or free-fall gravity design for the counter-current preheat of the 4×20 mesh pellets. In the case of wet extrusions, the preheater may be downsized or eliminated to reserve sufficient waste heat to supply the rotary dryer unit.

The fluid bed or spouting bed would be fired by direct fuel injection to 1800° to 2200° F. (980° to 1200° C.) depending on the mix bloating or vitrification temperature requirements. The combustible fraction present in the pellet feed may supply up to 80–90% of the process fuel requirement. The remaining 10% should be supplied by external fuel injection to provide for final temperature control. This external fuel may be comprised of virtually any liquid, solid or alternate fuel source.

The product overflow from the fluidized bed unit is directed to a cooling device for the purpose of product cooling and heat recovery. One option is to use an indirect cooling device, with the preheated air from the cooler directed to the radiant heat exchanger before utilization as preheated fluidization air. The indirect cooler would generate a preheated air temperature of 250°–300° C. with the radiant heat exchanger increasing the air temperature to 500°–700° C.

The final product from the fluid bed process will be a ⅜×20 mesh aggregate product suitable for use as either a lightweight sand product for use in concrete or in lightweight cement block production, or applications requiring similar strength and density characteristics.

DESCRIPTION OF THE DRAWINGS

The invention will be described in connection with the annexed drawings which are not considered to limit the invention.

DETAILED DESCRIPTION OF THE INVENTION

Figure 1:
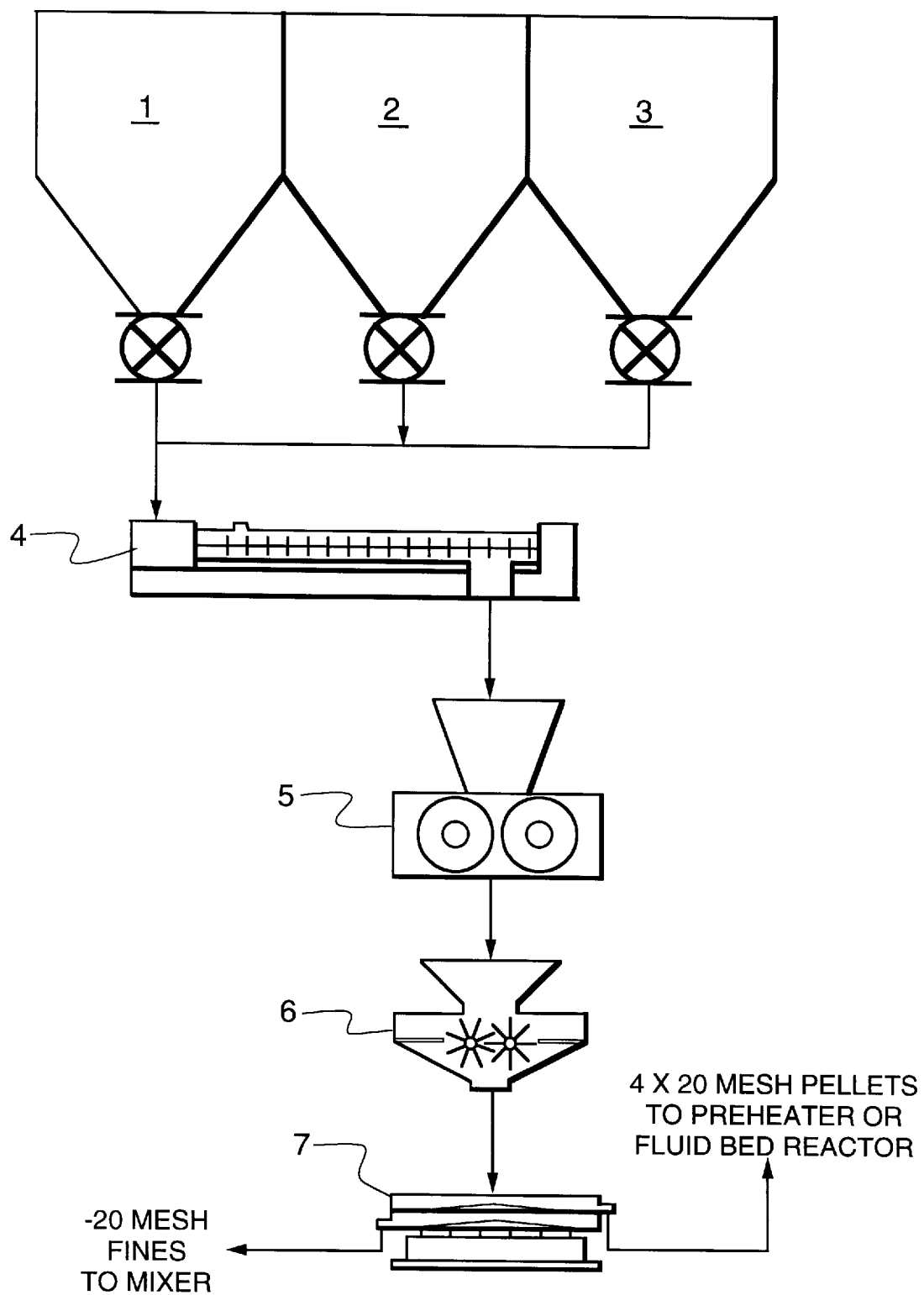
FIGS. 1 and 2 illustrate two embodiments of the feed circuit of the present invention.
Figure 2:
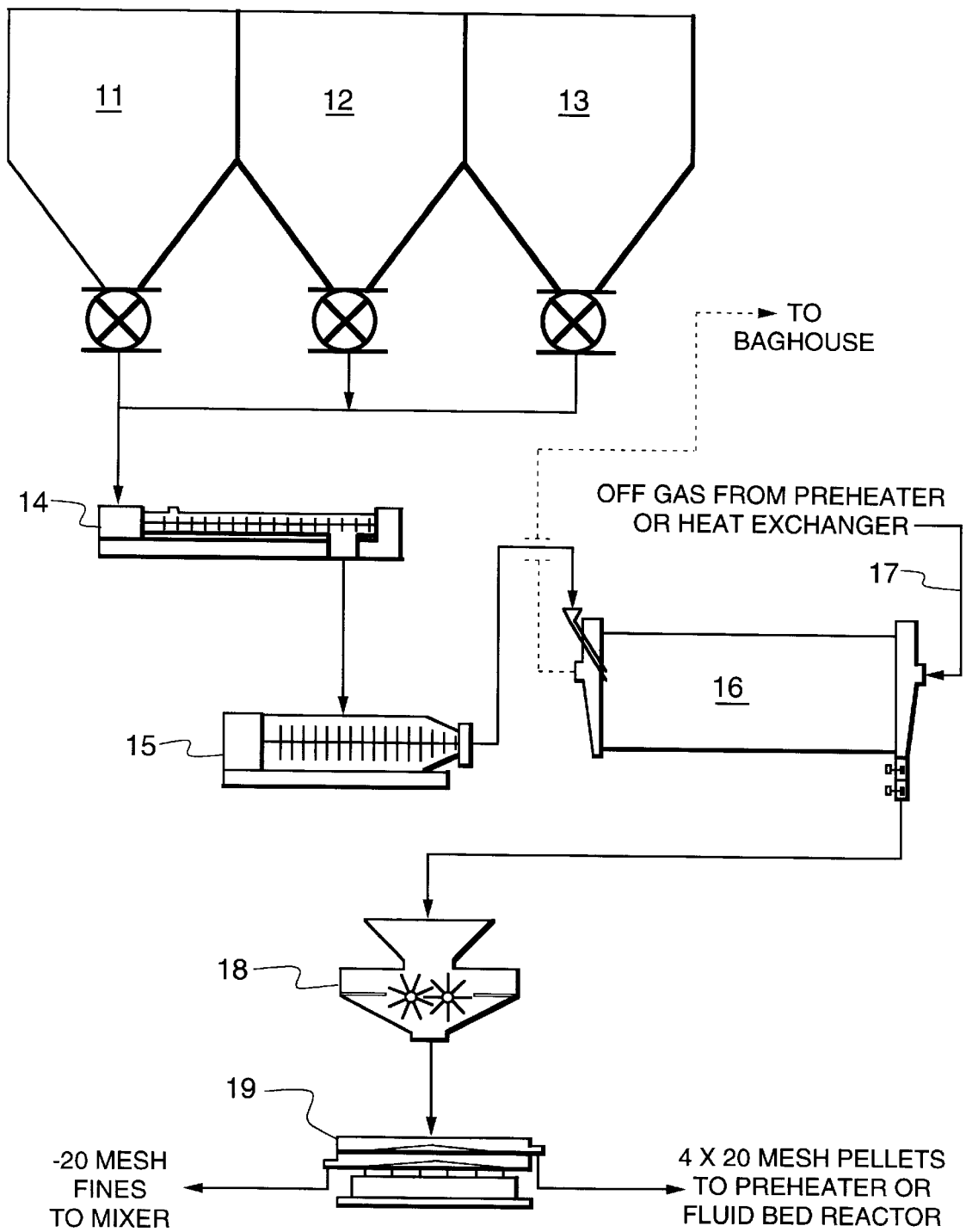

FIGS. 1 and 2 depict two different configurations of feed circuit which may be utilized in practicing the invention. The selection of which feed circuit is appropriate for a given application is based on the physical properties of the materials to be processed and their ability to be granulated into burnable feed particles.

The feed circuit of FIG. 1 may be advantageously utilized for the preparation of dry or low moisture components. For this system, clay or ground shale from storage bin 1 are mixed with dry or semi-dry waste components (such as fly ash, boiler ash or municipal prepared garbage, etc.) from storage bins 2 and 3 in mixer means 4, which may be a pug mill mixer or a similar device. The design of the mixer 4 will ensure uniform blending and the degradation of agglomerates and fibers contained in the various components. The thus prepared mix is then fed to a compactor means 5, such as a roll compactor, to form a pressed cake. This compacted cake (which is preferably approximately ¼–½" in thickness) is then fed to a granulating device 6 to break up the cake and form minus 4 mesh particles. These particles are then screened on a screening means 7, preferably a 20 mesh screen, and the 4×20 mesh fraction (generally 65% of the feed input to the granulator) is stored in a surge bin (not shown) or similar device which feeds to a material preheater or a fluid bed reactor (both shown, for example, in FIGS. 3, 4 and 6) utilized in the thermal processing circuit. The minus 20 mesh fines generated during the sizing process are returned to the mixer 4 or compactor 5.

FIG. 2 illustrates a system that may be utilized for the preparation of wet components such as clays, sewage sludge, water treatment sludge, deinking paper sludge, fibrous sludges, etc. containing in excess of 5–10% free moisture. In this approach, a mixer 14 such as a pug mill mixer or similar device is used to combine the wet components provided from storage means 11, 12 and 13 and ensure uniform blending and the degradation of agglomerates and fibers contained in the various components. The mix moisture level may then be either increased through water addition, or reduced by recycling a portion of the −20 mesh fines from the dryer stream back to the component mixer 14. This moisture adjustment is required to optimize the material's extrusion properties to ensure the formation of a dense extrusion and control the extruder power consumption and die wear. The component mix is then discharged into an extruder means 15 where 1" or ½" thick extrusions (or other sizes) are formed of various lengths, with the length dictated by the point the extrusion breaks under its own weight. If necessary, a cutting device (not shown) may be utilized to adjust the extrusion length to facilitate subsequent handling on conveyors and in the dryer means 16.

The extrusions, with moisture levels as high as 30% in some cases, are conveyed directly to a dryer means 16, which may be, for example, a rotary dryer unit. This dryer may utilize waste heat from the material preheater or heat exchanger used in the thermal processing circuit, which heat is delivered via conduit 17. If necessary, the material preheater may be eliminated from the thermal processing circuit to ensure that a dryer exit gas temperature >120° C. can be maintained. Drying of the extruded mix is required to obtain a hard, brittle extrusion that is suitable for granulation/screening and handling. The final moisture level required will vary depending on the components used in the mix, but will typical fall into a range below 5% free moisture. The dry extrusions are then fed to the granulator unit 18 and subsequent screen 19 to produce a 4×20 mesh pellet feed that is then fed to the material preheater or directly into the fluid bed reactor. The minus 20 mesh dry fraction from the screening is returned to the mixer 14 for mix moisture control and/or recovery.

FIGS. 3–6 illustrate variations of the complete systems of the present invention which features variations of the pyroprocessing circuit which can be utilized in the process of the present invention. Typically, the main pyroprocessing unit utilized in the present invention is a fluidized bed reactor utilizing a refractory air distribution plate for conventional fluid bed operation, or a high velocity throat for spouting bed operation. The latter serves to reduce the overall pressure drop of the system, thereby offering a lower power consumption. Four system configurations are described in FIGS. 3–6, with the system configuration dictated by the physical characteristics (moisture and volatility) of the raw material components.

Figure 3:
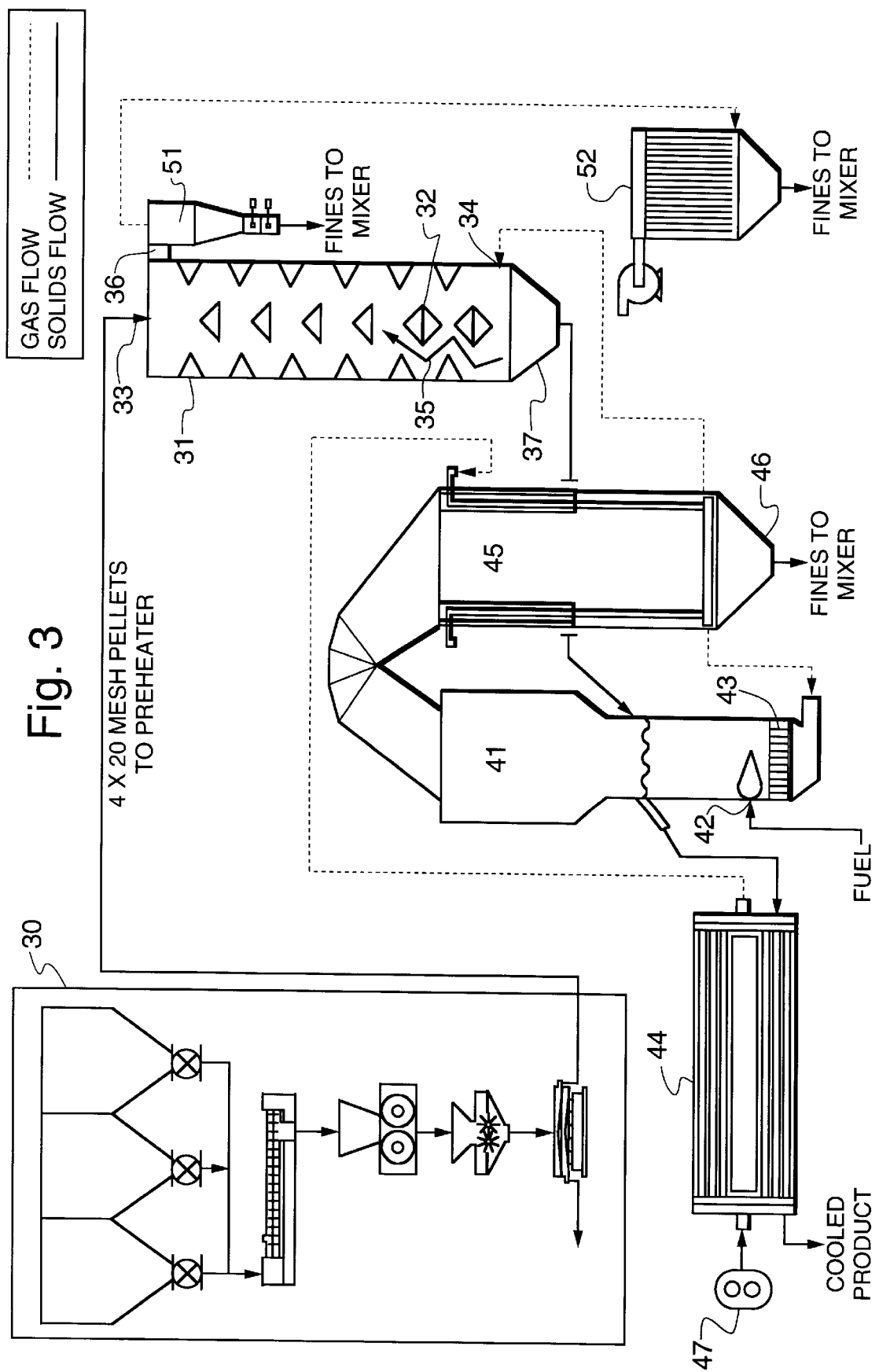
FIGS. 3–6 illustrate various embodiments of pyroprocessing systems which can be utilized in conjunction with the present invention.

The system of FIG. 3 is designed to accept the sized 4×20 mesh (or similar) dry or semi-dry feed pellets from the compaction/granulation circuit, generally depicted as 30. The feed is directed by any convenient method to the free-fall material preheating device 31.

Preheating device 31 is a so-called "gravity flow preheater". In the gravity flow preheater, material to be preheated are continually fed into the top of the heat exchanger chamber and, driven by the force of gravity, are allowed to fall through the preheater, counter to the flow of hot gases introduced at or at or near the bottom of the preheater.

In typical gravity flow preheaters, a deflector system of a specific, optimized geometry is mounted within the preheater so that the material to be preheated does not fall in a straight line which would thereby reduce its exposure time to the hot combustion gases. As a result of these deflectors, the material, when fed into the top of the preheater, travels "zigzag" course designed to allow it a residence time sufficient for it to become sufficiently preheated. Also, the deflectors, by forcing the material to travel in a predetermined path, eliminate the possibility of hot gases by-passing the material.

It is through the direct contact with the upwardly flowing combustion gases that the downwardly flowing material becomes heated by a method in which the combustion gases to the material is more evenly distributed with the counter-flow method.

Gravity flow preheater 31 is typically a vessel formed of stainless steel, and preferably has a rectangular cross-section which facilitates construction and attachment of deflectors 32. Unheated material to be preheated is fed into the preheater through inlets in the top (not shown) in the direction of arrow 33. Heated gas enters preheater 31 through inlet 34 and travels in the direction of arrow 35. The combustion gas exits through the top of the preheater through the exhaust outlet 36.

As indicated, the material flows counter-current in preheater 31 to the upward flowing process gas stream, discharges from the bin 37 located at the bottom of the preheater 31, and is then fed to the fluid bed reactor 41. The feed location in the reactor 41 may be any location from the air distribution plate or high-velocity throat to the freeboard zone located above the top of the bed. A feed location below the top of the bed is ideal to ensure complete combustion of the volatile organic fraction within the bed. The particles are retained in the fluid bed unit for a period of time dictated by the bed volume, material input rate and fluidization density/bed voidage. Although dependant on the chemistry of the feed material and capacity, the material residence time will typically on the order of one hour.

The process temperature in the bed is maintained through the injection of liquid or solid fuel sources into the unit at fuel inlet 42 immediately above the throat or air distribution plate 43. To provide for adequate control, this fuel injection will typically comprise a minimum of 10% of the total fuel input to the reactor. If there is no organic or inorganic carbon source in the feed mixture, the fuel injection may comprise 100% of the fuel input to the reactor. The fluid bed will typically operate in the range of 1000°–1200° C. As the fluid bed offers excellent control and temperature uniformity, the operating conditions can be easily adjusted to optimize product density and chemistry.

Figure 5:
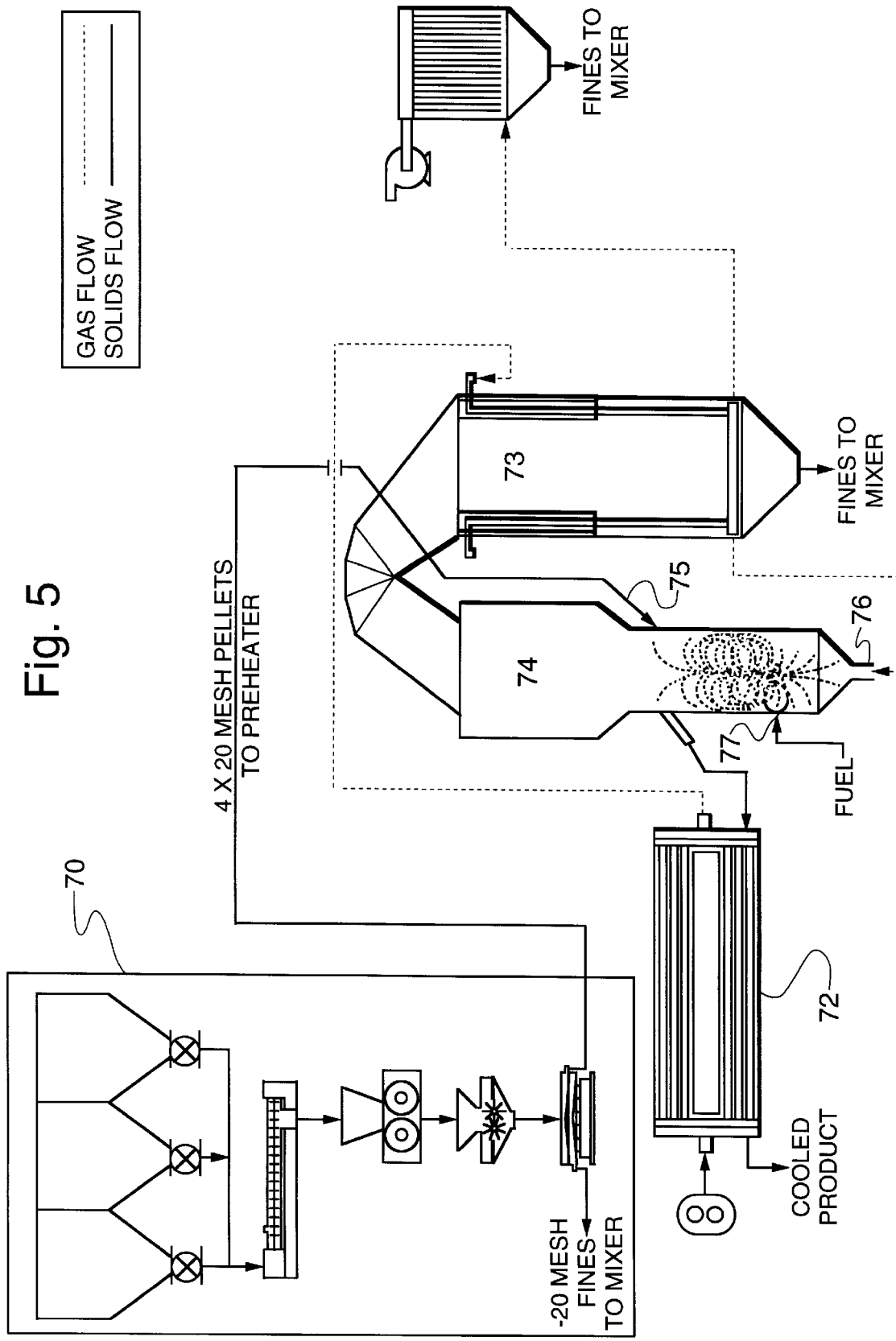

The aggregate product overflows from the fluid bed unit 41 into a product cooler means 44. In a preferred embodiment, this cooler is of an indirect design (rotary, packed bed, etc.) to prevent the return of product fines to the fluid bed reactor. Such fines return is not desired since it serves to increase the dust loading in the thermal processing circuit and has the potential to form deposits under the air distribution plate located above the fluid bed plenum chamber. In the depicted embodiment, cooler 44 is an indirect rotary cooler. However, the use of a spouting bed configuration as depicted in FIG. 5 rather than a fluid bed reactor allows the use of a direct contact cooler (packed bed, rotary, etc.) as such a reactor can accommodate the return of fines while minimizing deposit potential. The cooled aggregate product discharge is directed from cooler 44 to a crushing circuit (not shown) for final sizing.

The primary process air is supplied by a low pressure blower or fan 47 to product cooler 44. Heat recovery from the product typically generates a cooler air outlet temperature of from about 200° to about 400° C. Such process air exiting from cooler 42 will typically contain product fines. This preheated air stream is then directed to a heat exchanger 45 such as a radiant heat exchanger where it is further preheated in parallel or counter-current flow to reactor off gas stream to a temperature of 500° to 700° C. This preheated air is then directed to the fluid bed reactor to support thermal processing and reduce the fuel consumption. Fines that settle out of the process flow in heat exchanger 45 are discharged from the unit at outlet 46 and returned to the feed preparation circuit.

As shown in FIG. 3 and discussed above, the gas stream is drawn through an indirect heat exchanger followed by being directed to the preheater. The heat exchanger reduces the process gas temperature to below 500°–600° C. prior to entry into the material preheater. This reduced preheater inlet gas temperature will minimize the volatilization or combustion of the feed organic component. In addition, the short particle residence time offered by the preheater (several seconds) will limit material preheat to <400° C. to further limit organic volatilization. When there are not any organic volatiles present in the feed material, the heat exchanger may be eliminated and the fluid bed reactor off gas stream can be sent directly to the material preheater. Likewise, if there is a significant volatile organic component present in the feed, the material preheater may be eliminated and the particles can be fed directly to the fluid bed reactor.

Optionally, preheater cleanup cyclone 51 can be utilized. Fines collected from the preheater cleanup cyclone can be returned to the feed preparation circuit. The off, cleaned gas from the cyclone is then directed to a scrubber or particulate filtration device 52. Fines collected at the filtration device may also be returned to the feed preparation circuit.

Figure 4:
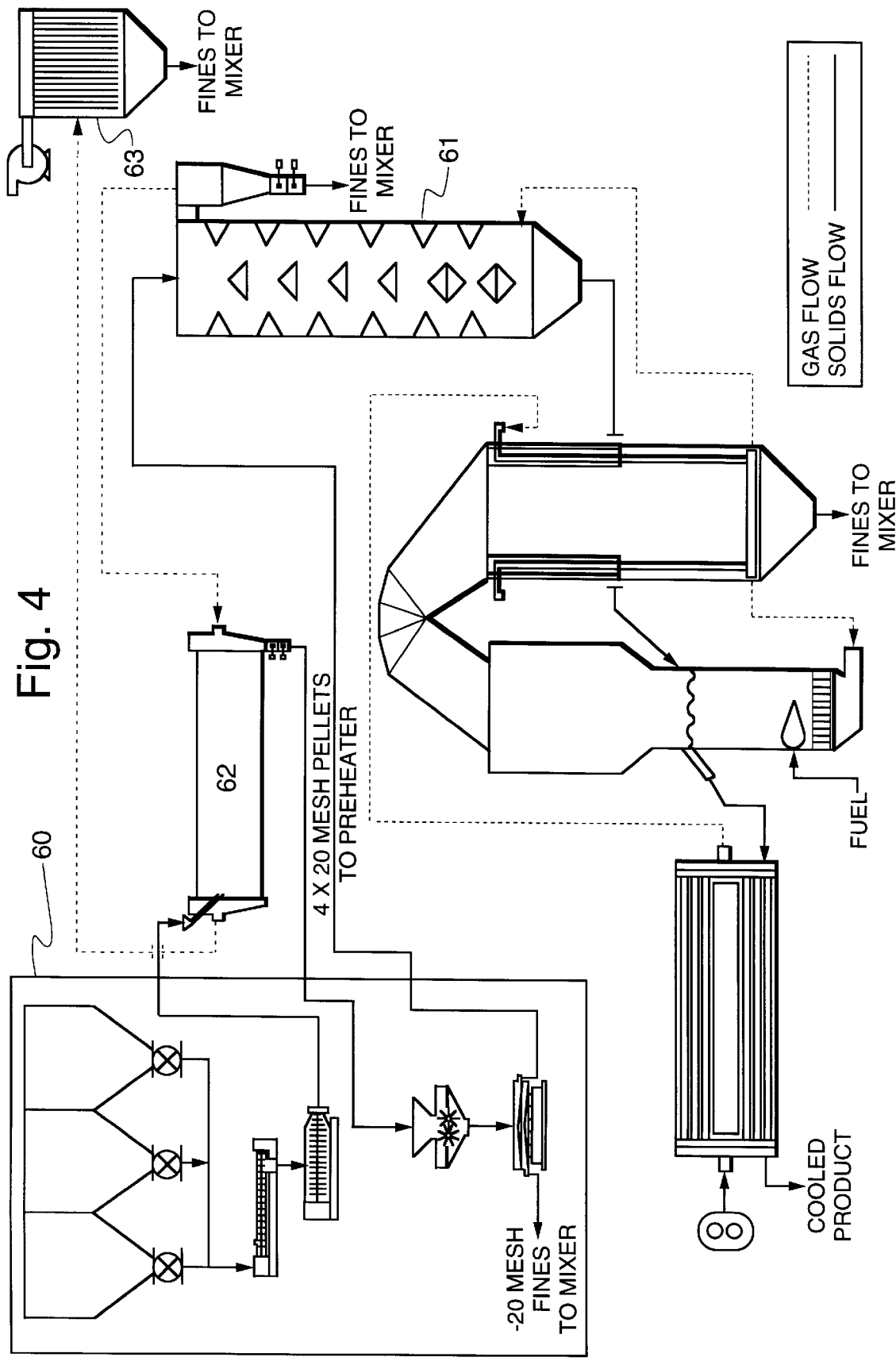

FIG. 4 illustrates a system that is suitable to accept material of a size such as, for example, 4×20 mesh dry feed pellets from extrusion/granulation circuit 60. If the drying heat load is sufficiently low, the feed is directed to free-fall material preheating device 61, and preheater 61 off gas stream is directed to the rotary dryer 62. The scrubber or particulate collection device 63 is situated after the dryer 62 to condition the dryer off gas stream. The thermal processing circuit then remains the same as is shown in FIG. 3 described above.

In the case of a high dryer heat load, the material preheater is eliminated to ensure a dryer outlet gas temperature in excess of 120° C. The dry feed pellets generated by the feed preparation circuit are then fed directly to the fluid bed reactor for final processing. The cooler, fluid bed and heat exchanger configuration remain the same as described for the system of FIG. 3.

FIG. 5 illustrates a system that is suitable to accept material of a size such as, for example, 4×20 mesh dry feed pellets from the compaction/granulation or extrusion/granulation circuits 70. The material preheater is excluded from the thermal processing circuit to eliminate and/or reduce the emissions of volatile organics. The dry or semi-dry feed pellets are fed directly to fluid bed reactor 71. Indirect rotary cooler 72 and radiant heat exchanger 73 are the same as set forth in FIG. 3. The system of FIG. 5 illustrates, however, the use of spouting bed reactor 74 rather than a fluid bed reactor.

The spouting bed reactor includes a vessel having an inlet 75 for the material from the feed preparation circuit. The spouting bed vessel 74 provides an extended material residence time of up to two hours. The superficial fluidization velocity in this the reactor is selected to maintain an actively fluidized bed above the high velocity inlet throat section 76. This high velocity throat (+6000 fpm) replaces the typical air distribution plate required for fluid bed processing, thereby reducing the overall system pressure drop. The use of a single inlet 76 duct rather than multiple small diameter orifices as in the fluid bed system described above presents the advantage of allowing for the use of particle laden preheated air while minimizing the potential for dust related blockages at the inlet to the system. The bed is suspended above the throat, and the jetting action produced in the center of the bed serves to generate a spouting action for excellent mixing and thermal transfer characteristics. Fuel is supplied through inlet 77 for supporting combustion within vessel 74.

Figure 6:
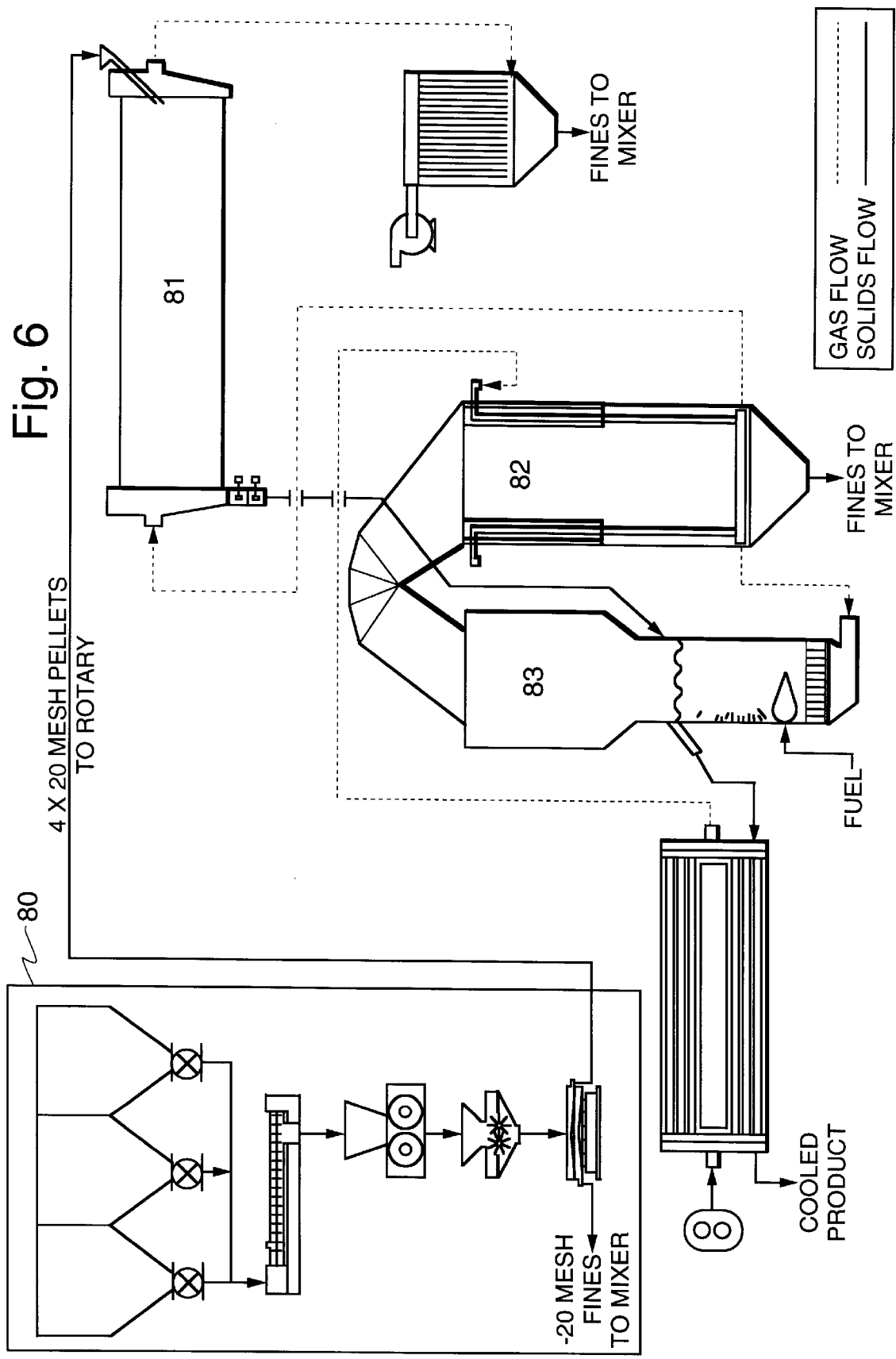

FIG. 6 illustrates a system that is suitable to accept material of a size such as, for example, 4×20 mesh dry feed pellets from compaction/granulation circuit 80. In this embodiment the free-fall material preheater as shown in other embodiment is replaced with a rotary preheating device 81. The process gas stream exiting the heat exchanger 82 is directed to the rotary preheater 81, and the preheated material stream is directed to the fluid bed reactor 83. The cooler, fluid bed and heat exchanger configurations remain the same as described for the embodiment of FIG. 3.

It is intended that the foregoing be a description of the preferred embodiments, but that the invention be limited solely by that which is within the scope of the intended claims.

We claim:

1. A method to produce aggregate products from waste material streams, said method comprising:
   a. combining an encapsulation material with said waste materials to form a mix suitable for granulation,
   b. feeding the mix to a granulation means to form particles having a size suitable to be thermally treated in a bed thermal processing means;
   c. delivering the particles into a bed thermal processing apparatus in which the particles are converted into an aggregate product; and
   d. cooling the aggregate product.

2. The method of claim 1 wherein the encapsulation material is clay or shale.

3. The method of claim 1 wherein, following step b., the particles are directed to a preheating means after which the preheated particles are delivered to a bed thermal processing apparatus.

4. The method of claim 3 further comprising directing the process gas from the bed thermal processing apparatus to the preheating means.

5. The method of claim 1 wherein step a. comprises:
   combining an encapsulation material comprising clay or ground shale with the waste materials in a mixing device to form a mix; and
   feeding the mix to a roll compactor to form a compacted cake.

6. The method of claim 1 wherein step a. comprises:
   combining an encapsulation material with the waste materials in a mixing device to form a mix; and
   feeding the mix to an extruder to form an extruded product.

7. The method of claim 1 wherein the waste material contains an energy value in the form of combustible organic or inorganic compounds.

8. The method of claim 7 wherein the energy value of the waste material is used to satisfy a portion of the process energy requirements.

9. The method of claim 1 wherein the waste materials are municipal garbage.

10. The method of claim 1 wherein the waste materials are municipal sewage sludge wastes.

11. The method of claim 1 wherein the waste materials are selected from boiler ash, metallic fumes from metal processing, paper sludge from paper mills or deinking operations, gasifier slags, fly ash from power stations, and water treatment sludges.

12. The method of claim 1 wherein the particles formed in the granulation means have a size of about 4 mesh ×20 mesh.

13. The method of claim 1 wherein the material is preheated by free falling through a counter-current flow of heated air.

14. A method to produce aggregate products from waste material streams, said method comprising:
   a. feeding said waste materials to a granulation means to form particles having a size suitable to be thermally treated in a bed thermal processing means;
   b. delivering the particles into a bed thermal processing apparatus in which the particles are converted into an aggregate product; and
   c. cooling the aggregate product to a means for cooling the product.

15. An apparatus utilized for the continuous production of a aggregate product from a waste material and an encapsulation material, said apparatus comprising
   mixing means to combine the encapsulation material with the waste materials to form a mix;
   means to compact the mix;
   granulation means to form particles from the compacted mix having a size suitable to be thermally processed in a bed thermal processing means;
   a bed thermal processing means for receiving and thermally processing the particles to thereby form an aggregate therefrom; and
   means for cooling the aggregate product.

16. The apparatus of claim 15 further including preheating means located intermediate the granulation means and the bed thermal processing means.

17. The apparatus of claim 16 further comprising means to direct the process gas from the bed thermal processing means to the preheating means.

18. The apparatus of claim 15 wherein the means to compact the mix comprises a roll compactor which forms a compacted cake.

19. The apparatus of claim 15 wherein the means to compact the mix comprises an extruder.

20. The apparatus of claim 15 wherein the bed thermal processing means comprises a fluid bed system.

21. The apparatus of claim 15 wherein the bed thermal processing means comprises a spouting bed system.

22. The apparatus of claim 16 in which the preheater is a rotary preheater.

23. The apparatus of claim 16 in which the preheater is a gravity flow preheater.

* * * * *